United States Patent [19]

Lerche

[11] Patent Number: 4,910,674
[45] Date of Patent: Mar. 20, 1990

[54] NAVIGATION OF AIRCRAFT BY CORRELATION

[75] Inventor: Horst-Dieter Lerche, Stuhr, Fed. Rep. of Germany

[73] Assignee: MBB GmbH, Bremen, Fed. Rep. of Germany

[21] Appl. No.: 213,441

[22] Filed: Jun. 28, 1988

Related U.S. Application Data

[63] Continuation of Ser. No. 757,023, Jul. 19, 1985, abandoned.

[30] Foreign Application Priority Data

Jul. 21, 1984 [DE] Fed. Rep. of Germany ....... 3427020

[51] Int. Cl.⁴ .............................................. G06F 15/50
[52] U.S. Cl. ..................................... 364/443; 364/449; 342/64
[58] Field of Search ............... 364/443, 444, 447, 450; 340/970; 342/61–65

[56] References Cited

U.S. PATENT DOCUMENTS

| | | | |
|---|---|---|---|
| 4,144,571 | 3/1979 | Webber | 364/450 |
| 4,179,693 | 12/1979 | Evans et al. | 342/64 |
| 4,224,669 | 9/1980 | Brame | 364/449 |
| 4,495,500 | 1/1985 | Vickers | 364/449 |
| 4,514,733 | 4/1985 | Schmidtlein et al. | 342/64 |
| 4,520,445 | 5/1985 | Keearns | 364/450 |
| 4,584,646 | 4/1986 | Chan et al. | 364/443 |

FOREIGN PATENT DOCUMENTS

| | | | |
|---|---|---|---|
| 2025723 | 1/1980 | United Kingdom | 342/64 |
| 2060306 | 4/1981 | United Kingdom | 364/443 |

Primary Examiner—Gary Chin
Attorney, Agent, or Firm—Ralf H. Siegemund

[57] ABSTRACT

A method of navigation and serial guidance under utilization of elevational data correlation, wherein a correlator compares terrain specific elevational reference data, with actually acquired and processed altitude data, is improved by using a millimeter wave sensor operating in the atmospheric window of about 94 gigahertz; and being operated during cruising by back and forth scanning in a substantially vertical down direction across a prescribed flight path; occasionally the sensor is pivoted about a horizontal axis, for scanning in the forward direction in a forward search mode for purposes of target acquisition.

4 Claims, 3 Drawing Sheets

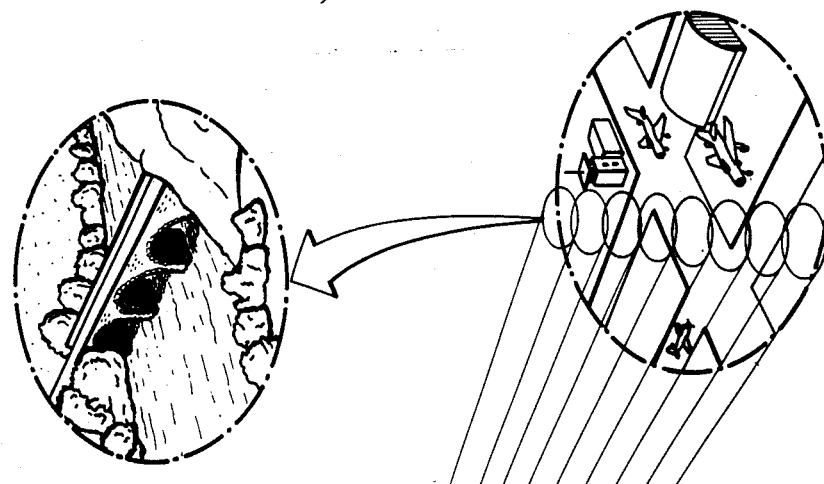
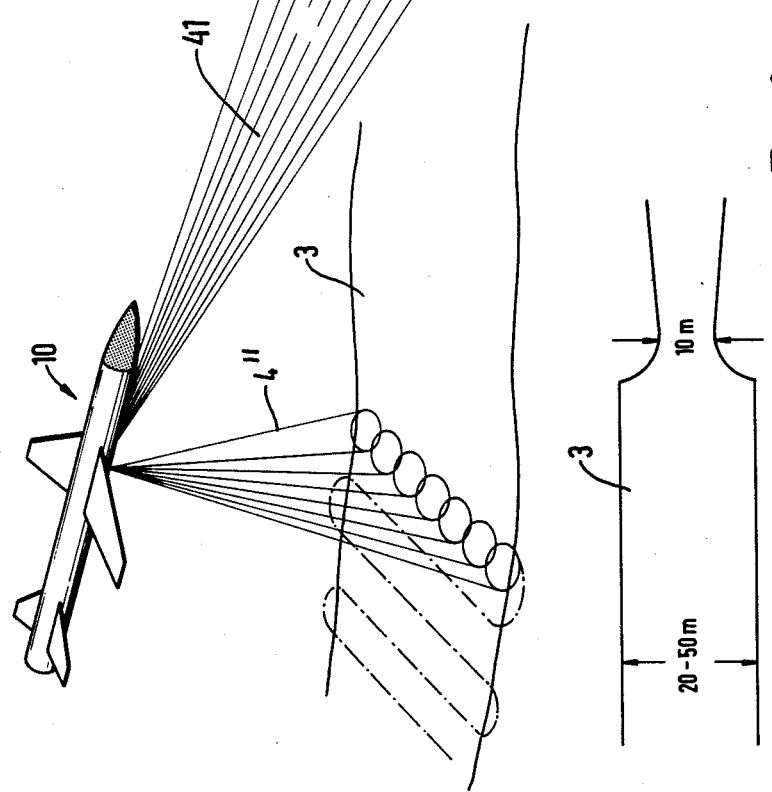
Fig. 3
Fig 3a

NAVIGATION OF AIRCRAFT BY CORRELATION

BACKGROUND OF THE INVENTION

The present invention relates to a navigation and aerial guidance system operating under the principle of altitude i.e. elevational data correlation, using a storage facility which holds terrain elevation data of a particular area in a format as actually acquired, and, also suitably processed reference data; the system uses also a sensor cooperating with a correlator that uses these reference data in order to obtain as accurate as possible information of the whereabouts of the particular aircraft.

Navigational systems of the type to which the invention pertains are for example known through German printed patent application 30 11 556 (see also U.S. Pat. Ser. No. 249,205, filed 03/30/1981). The operation of systems of this type uses particularly actually acquired and stored elevational reference data and is in fact quite suitable to obtain navigational information, whereby however the quality and accuracy of these data depend more or less, on the extensiveness of the equipment by means of which, on the one hand, correlation is determined, and on the other hand how detailed (resolution) the information as to elevational specifics is supposed to be, for both, reference data and running elevational measurements on overflight.

The navigational equipment of the publication mentioned above permits tracking along any aerial path, whereby the actually acquired elevational data during overflight are used for updating the reference data once correlation was found. The accuracy thus obtained, particularly on account of the updating is substantial, but it is an ongoing task to increase further accuracy of the equipment, without commensurate increase in complexity.

DESCRIPTION OF THE INVENTION

It is an object of the present invention to provide a new and improved navigational system being comparatively inexpensive but still permitting precise navigational guidance, including target measurement and final approach for steering and navigation.

It is therefore a specific object of the present invention to provide a new and improved areal guidance and navigational system using the principle of altitude data correlation and wherein storage device contains elevational reference data of a particular area of operation to be compared with actually acquired and processed areal data under utilization of a correlator, to determine the actual or true position and whereabouts of the craft.

In accordance with the preferred embodiment of the present invention it is suggested to provide a sensor operating in the millimeter wave length range, corresponding to an atmospheric window of 94 gigahertz, such that the sensor facing the ground is operated with a pivot mechanism for continuously scanning the ground below, basically in a direction transverse to the direction of flight, and that occasionally a pivot mechanism switches over the sensor towards a forwardly directed field of view, particularly for purposes of target approach and/or target measurement.

The utilization of a millimeter range sensor and operation thereof permits in fact a substantial increase in the accuracy for regular flight and cruise situations, as well as for target and final phase approaches. Moreover any effect of emission of radiation by the craft itself can be substantially weakened through tight bundling and focusing of the sensor beam, under strong attenuation of side lobes, so that the danger of discovery is substantially impeded and the survivability is correspondingly increased.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

FIG. 3 shows the improvement provided by the invention with regard to a changeover from regular cruising to target approach and/or measurement; and FIG. 3a is a top elevation of a detail shown in FIG. 3.

Proceeding now to the detailed description of the drawing, FIG. 1 illustrates an aircraft 1, for example a military plane which flies across ground 2 and at relatively low altitudes. It is assumed of course, that the ground is contoured as to its elevational profile and the craft is supposed to follow a particular course, which is denoted by a strip 3. Typically this trip may be between 20 and 50 meters wide. It is furthermore assumed that the craft includes a correlation computer which holds stored reference data, and in which particularly the elevational and altitude contour of the terrain 2 is stored. The craft now searches for real altitude data which provide optimum correlation with the stored reference data as an indication that the craft is indeed over and above the desired flight path 3.

Generally speaking, and referring here particularly to prior art practice, the sensor has a certain cone from which it receives beamed-down radiation. The sensing equipment provides a certain cone 4 of the radiation to be reflected by the ground and to be received by the sensor in the craft. The sensor that monitors the reflection of the radiation from cone 4 may cover wider range and sensitivity area.

Figure 2:
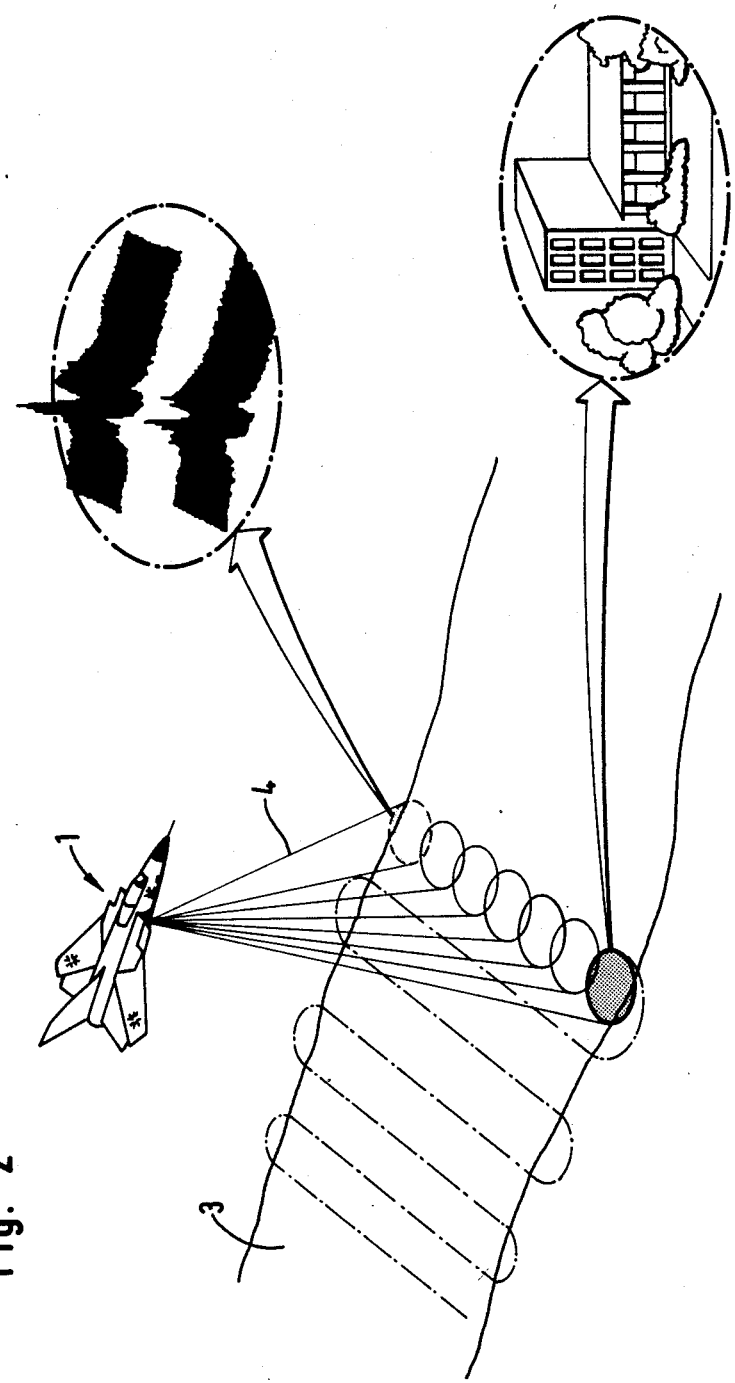
FIG. 2 illustrates a detail demonstrating particularly the inventive improvement, the FIG. can be construed as an enlarged portion of FIG. 1.

Turning specifically to FIG. 2, the radiation cone 4' as emitted by the craft is assumed to be much tighter bundled; i.e. as the beam cone intercepts ground the diameter of the intercept circle covers much less and as much smaller than the strip 3 of interest is wide. The radiation beamed down is in the millimeter range, covering particularly the 94 gigahertz, atmospheric window. This cone 4' is deflected back and forth across the desired flight path 3 in a kind of meandering pattern. The deflection is carried out in a manner known per se and does not require elaboration. It involves in particular the deflection of the radiation emitting and receiving source, which can be suitably mounted. This particular bundle 4' is a rather tight one, if one compares the geometry involved under the assumption that as stated the flight path is between 20 and 50 meters wide; the diameter of the circle defined by the beam as intercepted by the ground is significantly smaller. This feature establishes a significant information density, as far as the reflected details of altitude variations are concerned, which in turn improves the degree of accuracy ascertainable by the correlation process.

Considering the smallness of the wavelength, it can readily be seen, that relatively small objects can be detected either as targets or as specific significant markers in the area of overflight. The two inserts in FIG. 2 show by way of example what is meant here, as far as the acquisition of terrain information is concerned, the upper insert shows the scan of a street with two tanks. The lower insert of FIG. 2 shows a building as an example. Conceivably, such details are not yet contained in the reference data bank. However, the system employs and is designed to operate with the principle of updating the reference databank by such an overflight. Hence these detailed elevational data are now acquired for subsequent use as reference.

Proceeding to the description of FIG. 3, a different craft 10 such as a cruise missile or the like, is shown to be equipped with a pivotable millimeter radiation source as stated, and scans across the flight path for detecting altitude differences on account of transit time deviations. This way the craft will proceed in normal fashion along the flight path 3, deviating only if the correlation data do not match the desired result, i.e. if insufficient correlation in front in the on-board calculations as between the terrain data scanned and the reference data stored in the craft.

The beam 4" is shown basically to be directed vertically down. There may be a slight forward angle for normal cruising operation. In addition the beam deflecting mechanism is provided with a tilt structure, for tilting the radiation source and receiver about a horizontal axis that extends transversely to the axis of the craft upon such tilting a more forwardly directed field of view obtains as indicated by the beams 41.

This mode of operation can also be termed the forward gear mode and will be used for final phase navigation for purposes of target approach and/or target measurement and data acquisition. From the illustration one can see that this final phase can be programmed towards searching for different specific targets. The correlator thus searches for a correlation with specific ground contours, representing the specific target. Moreover, FIG. 3a shows that a narrowed flight path in this final phase is narrowed for example to 10 meters at its narrowest point. In other words, the back and forth scanning mechanism will at least as far as effective data acquisition is concerned pivot over a more limited amplitude and deflection range.

Generally speaking, the inventive navigation and air guidance system operates in accordance with the principle of continuous elevational data correlation and by means of comparing actual, acquired data and reference data suitably stored. Actual or current data are used to update the reference data. A narrowly bundled millimeter source - sensor and scanning arrangement, scans during cruising the respective actual overflight area of the craft on a continuous basis; and by means of the back and forth pivot mechanism as described, thereby acquiring actual terrain data to be used for updating the reference data and for determining the actual position of the craft by means of correlation. The same sensor is, in addition, used in the final phase but is switched over to a forward scan and search mode so that now particular targets can be searched for and used either as operational targets or for purposes of further measurement.

It can readily be seen that the success of a mission of a craft can be significantly improved, particularly as far as surviveability is concerned because the navigational process is increased as far as accuracy is concerned. The effect of parasitic emission is significantly reduced. Also, a strong bundling and commensurate de facto elimination of side lobes (5) is beneficial in this regard. Moreover the final phase is operated, established and worked with in a highly precise manner. The processing of the data now can be carried out specifically out as follows.

Figure 1:
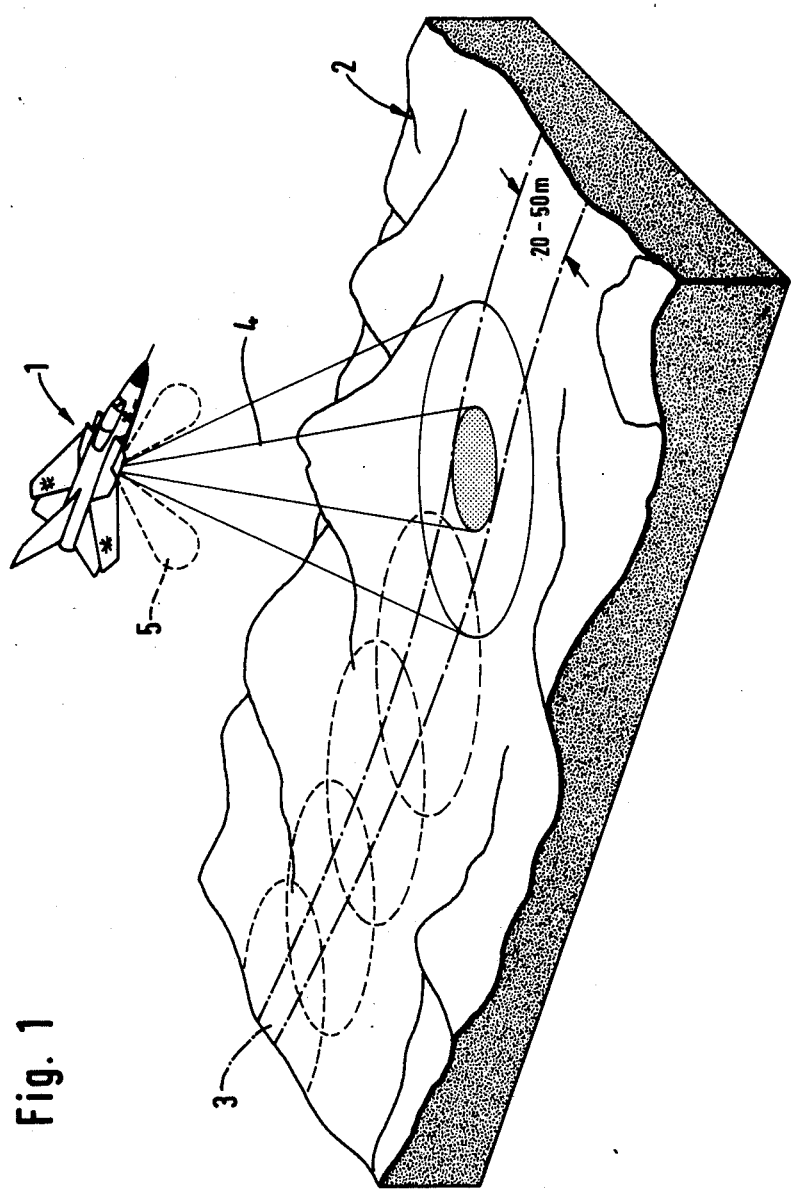
FIG. 1 is a general perspective view for demonstrating the principle of correlation type navigation and aircraft guidance to be used by the invention method and system.

First of all as is schematically indicated in FIG. 1, the side lobes 5, of radiation emission are held to a very, very small dimension, so as to avoid detection of a craft, by scattered radiation over a large area. The sensor information is basically processed in a two-dimensional fashion on account of the two-dimensional scanning process, running back and forth, over a very narrow area and across the flight path. The other dimension of scanning results from the progression of the craft along the flight path.

As mentioned earlier and as is specifically described in the above identified publication, the overall navigational accuracy can be increased through preplanned individual updating. The above mentioned specific target acquisition process can be used, for example temporarily during cruise flight in order to search for a specific target. That target then, may exhibit characteristic elevational information which is being newly acquired pursuant to the correlation process, stored in the craft as reference data, and used shortly thereafter as overflight reference data of specific significance. In this regard then, it should be mentioned that the acquisition of data building, either in the way described (but by a regular aircraft) during the flight or earlier, permit specific simple algorithms as far as correlations are concerned. Specifically, the search for a specific type of elevational contour (e.g. a particular kind of building) may be carried out with simulation of typical reference data recalled specifically for that purpose during a forward search mode and the actual measurement data acquired as this target is found, are then incorporated in the terrain specific reference data, used right away for overflight correlation (the beam being switched back to a straight down direction).

The narrowing of the bundle described above, of course, increases the resolution of the process and is in that regard a specifically significant feature for the detection of isolated significant and otherwise typical targets such as specific buildings or the like.

The measurement can be carried out specifically by using in fact not absolute data, but either directly or in addition using data that could be termed spatial differential data. These are noticeable as contrast changes and/or jumps in elevations. The millimeter sensor could be replaced by a scanning range finding device, such as a laser.

The invention is not limited to the embodiments described above, but all changes and modifications thereof not constituting departures from the spirit and scope of the invention, are intended to be included.

I claim:

1. In a method of navigation and aerial guidance under utilization of elevational data correlation, wherein a correlator compares terrain specific elevational reference data, with actually acquired and processed altitude data, the improvement comprising:

using a millimeter wave sensor operating in the atmospheric window of about 94 gigahertz for acquiring the altitude data to be fed to and to be used by the correlator;

operating the millimeter sensor during cruising and overflight by back and forth scanning and in a substantially vertical down direction across a prescribed flight path to obtain the acquired altitude data; and occasionally pivoting the sensor about a horizontal axis, for scanning in the forward direction for purposes of searching for particular targets to be tracked subsequently of said altitude to the acquiring data.

2. Method as in claim 1, said sensor having an image beam defined by tight bundling and strong side lobe attenuation.

3. Method as in claim 1, using and standardized reference data as stored to replace the terrain specific elevational reference data, in the correlation.

4. Method as in claim 1, further using contrasts as defined by elevational jumps as said reference data for the correlation as well.

* * * * *